United States Patent [19]

Chi

[11] Patent Number: 5,193,930
[45] Date of Patent: Mar. 16, 1993

[54] COUPLING FOR SECURING A HANDLEBAR STEM OF A BICYCLE

[76] Inventor: Yi C. Chi, No. 139-5, An Mei Rd., Mei Shan Village, Hou Li Hsiang Taichung Hsien, Taiwan

[21] Appl. No.: 903,995

[22] Filed: Jun. 24, 1992

[51] Int. Cl.[5] .................. B62K 21/18; F16D 1/06
[52] U.S. Cl. ...................... 403/24; 403/191; 403/290; 403/344; 74/551.1
[58] Field of Search .............. 74/551.1; 403/24, 190, 403/191, 289, 290, 344; 280/279, 280

[56] References Cited

U.S. PATENT DOCUMENTS

| | | | |
|---|---|---|---|
| 570,309 | 10/1896 | Johnson | 403/290 |
| 4,274,301 | 6/1981 | Katayama | 74/551.1 |
| 4,718,789 | 1/1988 | Kuenen | 403/191 X |
| 5,028,161 | 7/1991 | Peleg | 403/24 |
| 5,080,519 | 1/1992 | Chi | 403/24 |
| 5,095,770 | 3/1992 | Rader, III | 74/551.1 |

Primary Examiner—Richard M. Lorence
Attorney, Agent, or Firm—Perman & Green

[57] ABSTRACT

A coupling for securing a handlebar stem on a front fork including a tube engaged on the upper end of the front fork, a shank fixed on the tube, an opening formed in the shank close to the tube, the tube including a pair of panels, a lug extended from each of the panels, and a bolt engaged between the lugs for coupling the lugs together in order to fix the tube on the front fork.

4 Claims, 4 Drawing Sheets

COUPLING FOR SECURING A HANDLEBAR STEM OF A BICYCLE

BACKGROUND OF THE INVENTION

1. Field of the Invention

The present invention relates to a coupling, and more particularly to a coupling for securing a handlebar stem of a bicycle.

2. Description of the Prior Art

A typical fixing device for securing handlebar stem is disclosed in U.S. Pat. No. 4,274,301 to Katayama, filed Jun. 30, 1978, entitled "HANDLE STEM FIXING DEVICE FOR A BICYCLE AND THE LIKE". In this patent, a cone 3 is threadedly engaged on the lower end of a bolt 2 and caused to move radially outwards in order to fix the handle stem 5. However, an opening should be provided in the upper end of the handle stem 5 and the head 21 of the bolt 2 should be exposed such that the bolt 2 can be rotated; which means, water and dust may enter into the handle stem 5 easily, such that the parts are apt to be rusted.

Another type of coupling for securing a handlebar stem which is commercially available is shown in FIG. 5 and comprises a tube 41 engaged on the upper end of the front fork 30, and a shank 40 having one end fixed on the tube and having the other end for supporting the handlebar (not shown); the tube 41 includes a split 43 vertically formed therein in order to form a pair of adjacent edge portions and includes four lugs 42 formed integral on the edge portions respective such that the edge portions can be fixed together by two bolts 44. The lugs 42 and the bolts 44 are exposed and are apt to be rusted, in addition, the exposed configuration spoils the outer appearance of the handlebar stem.

The present invention has arisen to mitigate and/or obviate the afore-described disadvantages of the conventional couplings for securing handlebar stems.

SUMMARY OF THE INVENTION

The primary objective of the present invention is to provide a coupling for securing the handlebar stem of a bicycle in which the coupling is well protected and is not exposed.

In accordance with one aspect of the invention, there is provided a coupling for securing a handlebar stem on a front fork comprising a tube engaged on the front fork, a shank including a first end fixed on the tube and including an opening formed therein close to the tube, the tube including a pair of panels formed therein and located in the first end of the shank, a lug extended from each of the panels, and a bolt engaged between the lugs for coupling the lugs together in order to fix the tube on the front fork.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
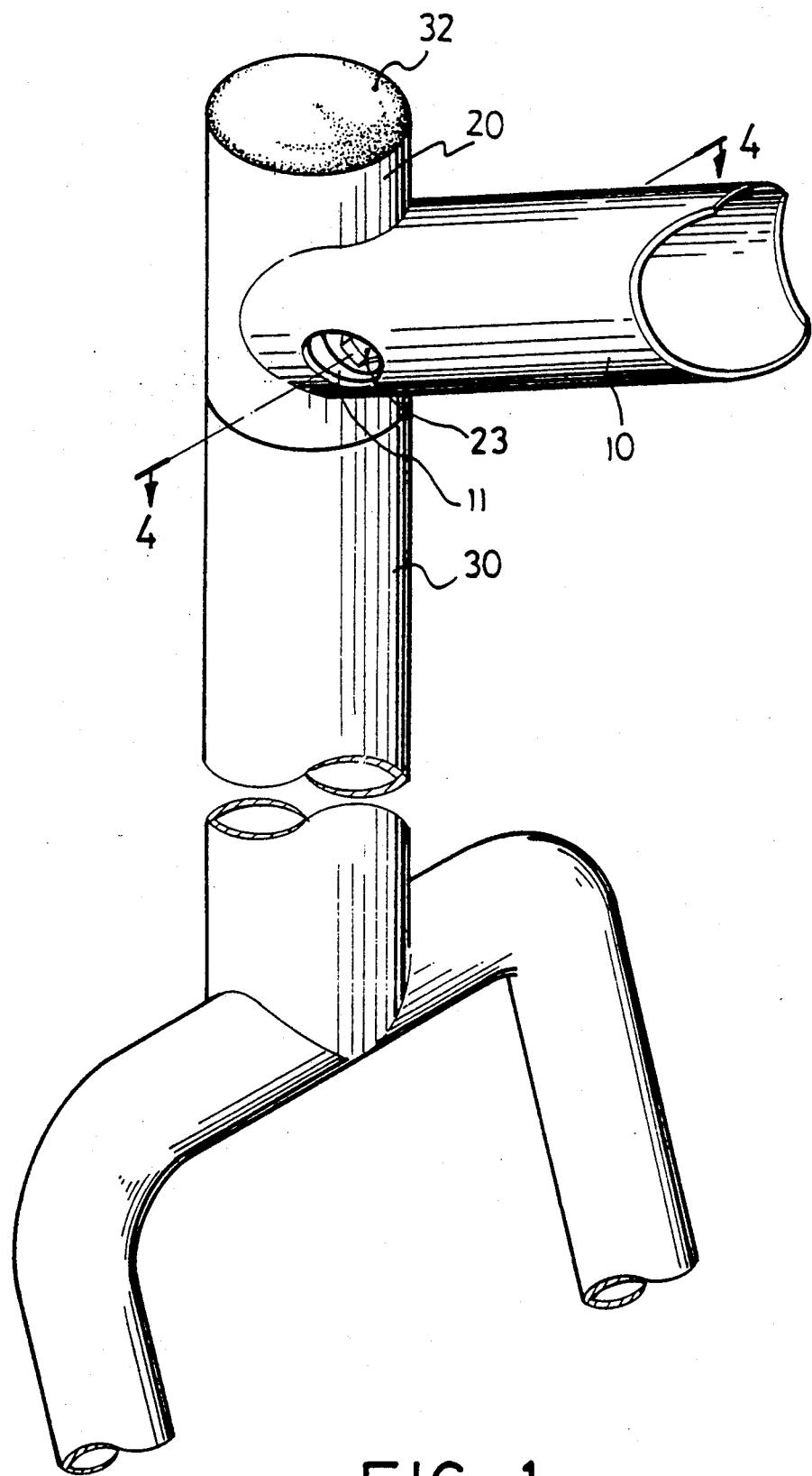
FIG. 1 is a perspective view of a coupling in accordance with the present invention.

Referring to the drawings, and initially to FIG. 1, a coupling for securing a handlebar stem in accordance with the present invention comprises generally a cylindrical tube 20 engaged on the upper end of a frame fork 30, a shank 10 having one end fixed to the tube 20 by such as welding processes and having the other end provided for supporting the handlebar (not shown). A cap 32 is engaged on the upper end of the tube 20 for enclosing the open upper end of the tube 20, and a lid 12 is engaged on an opening 11 which is formed in one side of the shank 10 close to the tube 20.

Figure 2:
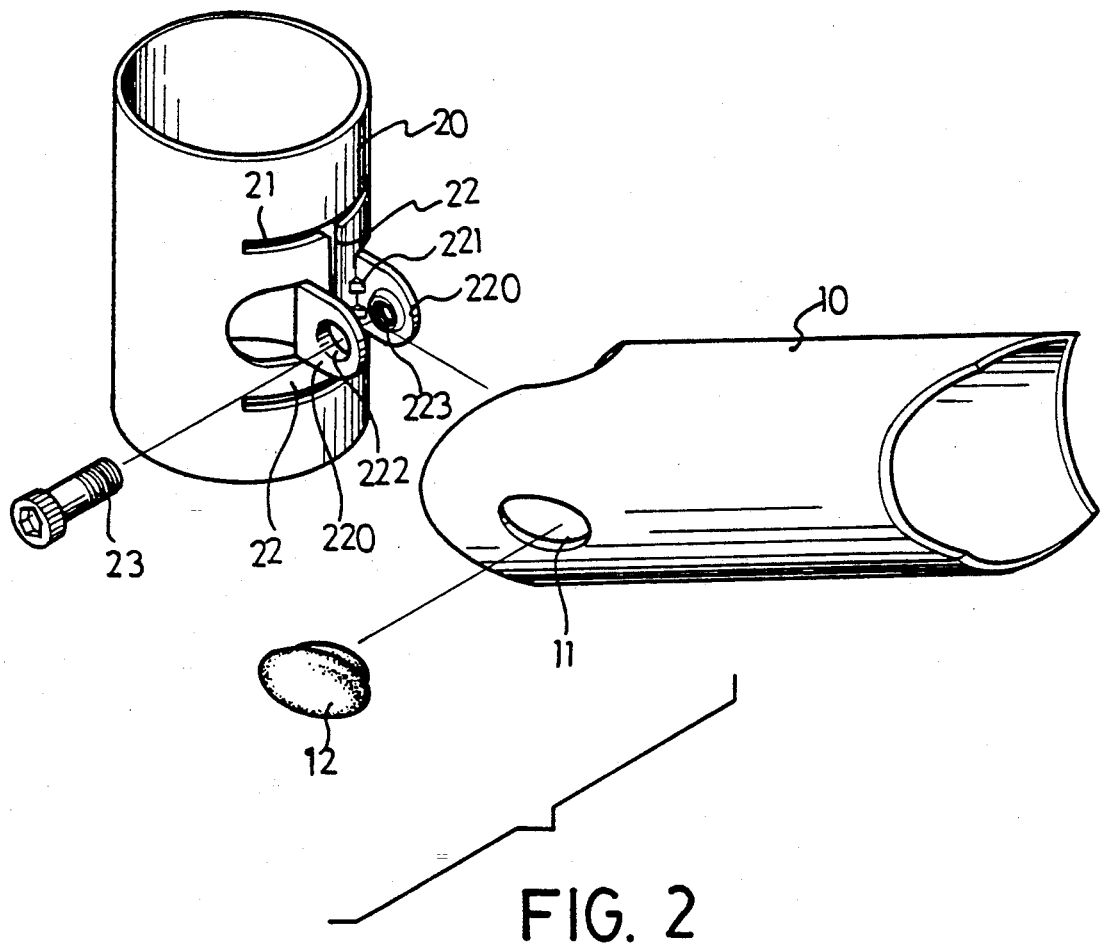
FIG. 2 is an exploded view of coupling.
Figure 3:
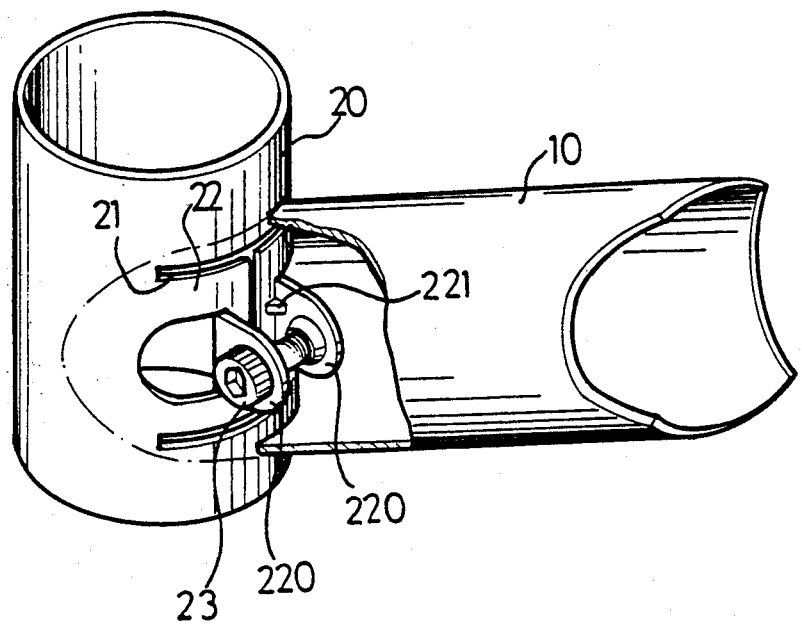
FIG. 3 is a perspective view of the coupling, in which part of the shank is cut off.
Figure 4:
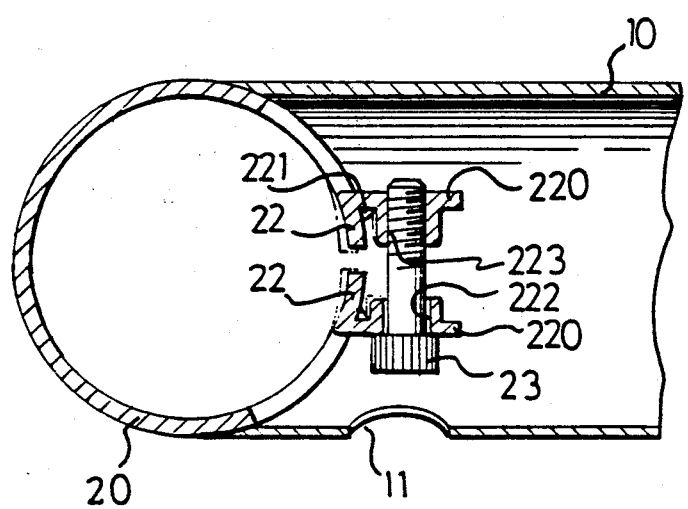
FIG. 4 is a cross sectional view taken along lines 4—4 of FIG. 1.
Figure 5:
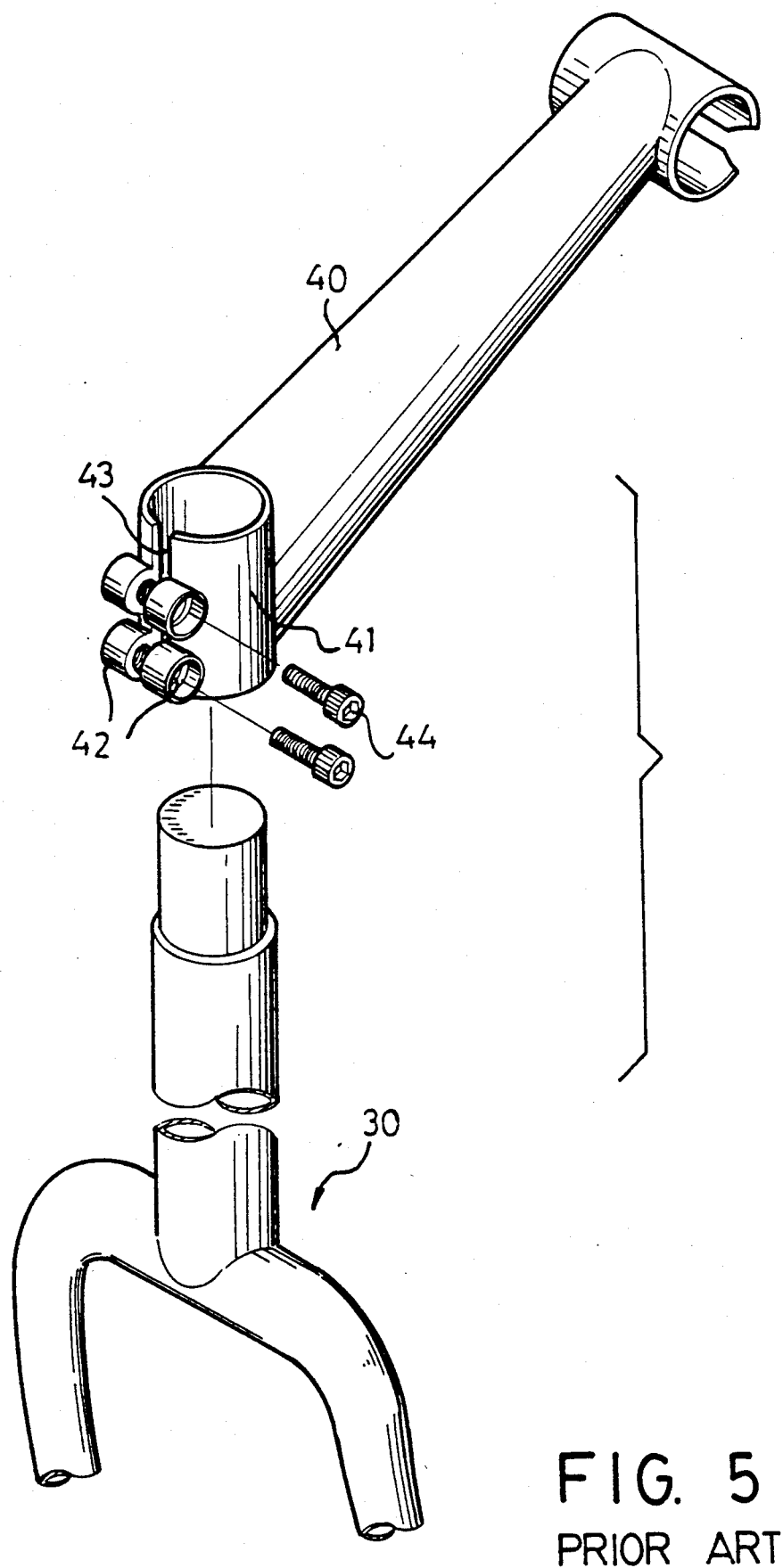
FIG. 5 is an exploded view of a typical coupling for securing handlebar stem.

Referring next to FIGS. 2 to 4, the tube 20 includes an I-shaped cut off portion 21 formed therein so as to form a pair of panels 22 each including a lug 220 extended therefrom, for example, the lugs 220 are punched from the panels 22. Two reinforced members 221 are provided on the coupling portion of each of the lugs 220 with the respective panel 22 for reinforcing purposes. One of the lugs 220 includes an aperture 222 formed therein, and the other lug 220 includes a screw hole 223 formed therein for threaded engagement with a bolt 23. The opening 11 of the shank 10 is aligned with the aperture 222 and the screw hole 223 such that the bolt 23 can be rotated, and the opening 11 is enclosed by the lid 12 such that the lugs 220 and the bolt 23 are enclosed and are shielded.

In operation, the lugs 220 are coupled together by the bolt 23 such that the tube 20 can be fixed onto the upper end of the frame fork 30.

Accordingly, the coupling for securing the handlebar stem in accordance with the present invention includes a pair of lugs and a bolt engaged between the lugs, which are shielded in the shank 10 such that the parts of the coupling are well shielded.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I CLAIM:

1. A coupling for securing a handlebar stem on a front fork comprising a tube engaged on said front fork, a shank including a first end fixed on said tube and including an opening formed therein close to said tube, said tube including a pair of panels formed therein and located in said first end of said shank, a lug extended from each of said panels, and a bolt engaged between said lugs for coupling said lugs together in order to fix said tube on said front fork.

2. A coupling according to claim 1, wherein said lugs include a first lug having an aperture formed therein and a second lug having a screw hole formed therein for engagement with said bolt, such that said lugs are coupled together by said bolt, and said aperture and said screw hole are aligned with said opening of said shank.

3. A coupling according to claim 1, wherein said tube includes an I-shaped cut off portion formed therein so as to form said panels.

4. A coupling for securing a handlebar stem on a front fork comprising a tube engaged on said front fork, a shank including a first end fixed on said tube and including an opening formed therein close to said tube, said tube including an I-shaped cut off portion formed therein so as to form a pair of panels, said panels located in said first end of said shank, a first lug extended from one of said panels and including an aperture formed therein and a second lug extended from the other of said panels and including a screw hole formed therein, said aperture of said first lug and said screw hole of said second lug aligned with said opening of said shank, and a bolt extended through said aperture of said first lug and threadedly engaged with said screw hole of said second lug for coupling said lugs together in order to fix said tube on said front fork.

* * * * *